T. N. EGERY.
Saw-Mandrel.
No. 215,050. Patented May 6, 1879.
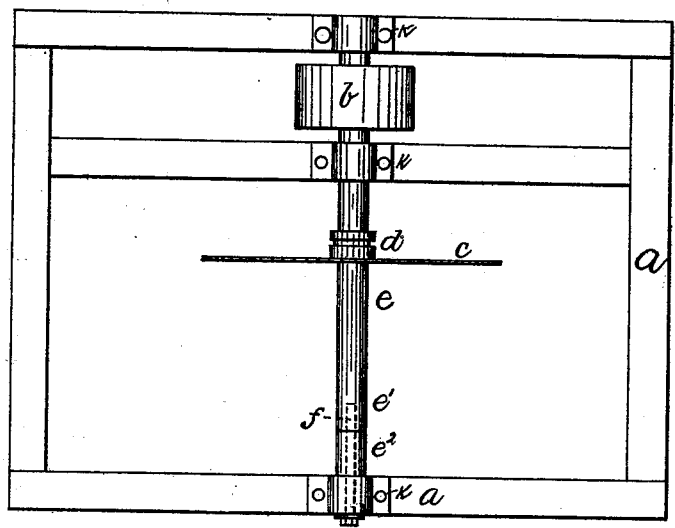

UNITED STATES PATENT OFFICE.

THOMAS N. EGERY, OF BANGOR, MAINE.

IMPROVEMENT IN SAW-MANDRELS.

Specification forming part of Letters Patent No. 215,050, dated May 6, 1879; application filed January 2, 1878.

*To all whom it may concern:*

Be it known that I, THOMAS N. EGERY, of Bangor, in the county of Penobscot and State of Maine, have invented certain new and useful Improvements in Saw-Mandrels; and I do hereby declare that the following is a full, clear, and exact description of the invention, that will enable others skilled in the art to which it appertains to make and use the same, reference being had to the accompanying drawings, forming a part of this specification, in which—

Figure 1 shows a plan; Fig. 2, a section of arbor $e$.

Same letters show like parts.

My invention consists of an improvement in circular sawing machines, and is designed to enable the saws to be removed from the arbor for sharpening or repairs, without taking the arbor from its boxes.

I effect my purpose by making the arbor in two parts, the division being near the end of the arbor farthest from the pulleys, and sufficiently far from the frame of the machine to permit the saws and collars to be slipped out through the space left when the outer section of the arbor is removed.

This removable section of the arbor is bored longitudinally, and is secured to the stationary part by a screw-bolt passing through it and into the stationary portion.

Reference to the drawing will assist in explaining my invention. At $a$ is shown the frame of the machine; $b$, the driving-pulley; $c$, the saw; $d$, the saw-collar, and $e$ the arbor. This arbor is, as stated, divided at $f$ into two parts, $e^1$ and $e^2$, and the part $e^2$ is made removable, leaving, when taken out or slipped back, a sufficient space between the end of the part $e^1$ and the frame $a$ to permit the saw and collar to slip through. When in place it is secured by a screw-bolt, $f'$, passing through the part $e^2$ and into the end of the part $e^1$. This is illustrated in the section Fig. 2.

This construction, as will be observed, does away with all couplings or like devices upon the arbor, the attachment being at the end, leaving the arbor itself unencumbered, and capable of being used for its whole length within the frame.

What I claim as my invention is—

In a circular sawing machine, the arbor $e$, provided with a removable end, $e^2$, bored longitudinally and held in place by a screw-bolt, $f$, passing through it and into the end of the stationary portion $e$, substantially as and for the purposes set forth.

In testimony that I claim the foregoing I have hereunto set my hand this 28th day of December, 1877.

THOS. N. EGERY.

Witnesses:
F. H. CLERQUE,
WM. FRANKLIN SEAVEY.